US009927663B2

(12) United States Patent
Miyazaki et al.

(10) Patent No.: US 9,927,663 B2
(45) Date of Patent: Mar. 27, 2018

(54) LIQUID CRYSTAL DISPLAY DEVICE (71) Applicant: Japan Display Inc., Minato-ku (JP)

(72) Inventors: Kayoko Miyazaki, Tokyo (JP); Keiji Tago, Tokyo (JP)

(73) Assignee: Japan Display Inc., Minato-ku (JP)

( * ) Notice: Subject to any disclaimer, the term of this patent is extended or adjusted under 35 U.S.C. 154(b) by 163 days.

(21) Appl. No.: 14/736,382

(22) Filed: Jun. 11, 2015

(65) Prior Publication Data
US 2015/0362804 A1 Dec. 17, 2015

(30) Foreign Application Priority Data
Jun. 13, 2014 (JP) ................. 2014-122760

(51) Int. Cl.
*G02F 1/1343* (2006.01)
*G02F 1/1335* (2006.01)

(52) U.S. Cl.
CPC .. *G02F 1/134309* (2013.01); *G02F 1/133514* (2013.01); *G02F 2001/134372* (2013.01)

(58) Field of Classification Search
CPC ............. G02F 1/1343; G02F 1/134309; G02F 1/13439; G02F 1/136286; G02F 1/155; G02F 1/1393; G02F 1/1395; G02F 1/136; G02F 1/218; G02F 1/134363; G02F 1/134327; G02F 1/133707; G02F 1/134336; G02F 1/0316; G02F 2001/134318; G02F 2001/134372; G02F 2001/134381;

(Continued)

(56) References Cited

U.S. PATENT DOCUMENTS

2003/0184698 A1* 10/2003 Ohta ................. G02F 1/134363
349/139
2004/0252249 A1* 12/2004 Hong .................... G02F 1/1362
349/37

(Continued)

FOREIGN PATENT DOCUMENTS

CN  101398563 A  4/2009
CN  103969901 A  8/2014

(Continued)

OTHER PUBLICATIONS

English translation of JP02010102205A, Title: Liquid Crystal Display Device, Author: Ochiai, Takahiro; Tanno, Junji; Imayama, Hirotaka; Ito, Osamu; Date of publication: May 6, 2010.*

(Continued)

*Primary Examiner* — Edward Glick
*Assistant Examiner* — Shan Liu
(74) *Attorney, Agent, or Firm* — Oblon, McClelland, Maier & Neustadt, L.L.P.

(57) ABSTRACT

A liquid crystal display device includes a first substrate including a first pixel electrode, a second pixel electrode, and a third pixel electrode, a second substrate including a first color filter opposed to the first pixel electrode, a second color filter opposed to the second pixel electrode, and a third color filter opposed to the third pixel electrode, and a liquid crystal layer held between the first substrate and the second substrate, a first interval along the first direction between the first pixel electrode and the second pixel electrode being smaller than a second interval along the first direction between the second pixel electrode and the third pixel electrode.

7 Claims, 7 Drawing Sheets (58) Field of Classification Search
CPC . G02F 2001/134345; G02F 2001/1357; G02F 2001/136218; G02F 2001/136295; G02F 2001/1552; G02F 2001/1555; G02F 2001/1557; G02F 2001/13629; G02F 2201/12; G02F 2201/121; G02F 2201/124; G02F 2201/122; G02F 2201/123; G02F 2201/14; G02F 2202/10; G02F 1/015; G02F 1/1362; G02F 1/136277; G02F 2001/13613; G02F 1/136209; G02F 1/136227; G02F 1/1365; G02F 2001/136222; G02F 2001/136231; G02F 2001/13625; G02F 2001/1635; G02F 1/1368; G02F 1/134372; H01L 27/124; H01L 27/3276; H01L 27/3297; H01L 27/3279; H01L 27/329; H01L 23/49534; H01L 2933/0016; H01L 27/02; H01L 2021/775; H01L 27/1214; H01L 27/2436; H01L 29/66037; H01L 29/66068; H01L 29/66227; H01L 29/72; H01L 29/786; H01L 2924/1304; H01L 51/0504; H01L 51/0508; G09G 2300/0421; G09G 2300/0426; G09G 2300/0439; G09G 3/3659; G09G 3/3648
USPC ...................................... 349/139–148, 41–43
See application file for complete search history.

(56) References Cited

U.S. PATENT DOCUMENTS

| | | | |
|---|---|---|---|
| 2005/0099573 A1* | 5/2005 | Kubo | G02F 1/134309 349/146 |
| 2006/0139545 A1* | 6/2006 | Hong | G02F 1/133555 349/141 |
| 2012/0050657 A1* | 3/2012 | Lin | G02F 1/136286 349/139 |
| 2012/0127148 A1 | 5/2012 | Lee et al. | |
| 2012/0182511 A1* | 7/2012 | Hisada | G02F 1/134363 349/139 |
| 2013/0016297 A1* | 1/2013 | Nakamura | G02F 1/133707 349/46 |
| 2013/0222745 A1* | 8/2013 | Niioka | G02F 1/133555 349/106 |
| 2013/0257700 A1* | 10/2013 | Chang | G02F 1/134363 345/87 |
| 2013/0300962 A1* | 11/2013 | Kitani | G02F 1/13306 349/37 |
| 2014/0028954 A1 | 1/2014 | Shibazaki | |
| 2014/0211133 A1* | 7/2014 | Huh | G02F 1/133512 349/104 |

FOREIGN PATENT DOCUMENTS

| | | |
|---|---|---|
| JP | 09-185081 A | 7/1997 |
| JP | 2010102205 A * | 5/2010 |
| JP | 2011-128508 A | 6/2011 |
| JP | 2012-113305 | 6/2012 |
| JP | 2013-20189 A | 1/2013 |
| WO | WO 20071119454 A1 | 10/2007 |

OTHER PUBLICATIONS

Japanese Office Action dated Jan. 30, 2018, issued in Japanese Patent Application No. 2014-122760 (with English translation).
Chinese Office Action dated Nov. 16, 2017 in Chinese Application No. 201510319390.3 (with English Translation), 15 pages.

* cited by examiner

LIQUID CRYSTAL DISPLAY DEVICE

CROSS-REFERENCE TO RELATED APPLICATIONS

This application is based upon and claims the benefit of priority from Japanese Patent Application No. 2014-122760, filed Jun. 13, 2014, the entire contents of which are incorporated herein by reference.

FIELD

Embodiments described herein relate generally to a liquid crystal display device.

BACKGROUND

Recently, a liquid crystal display device using a lateral electric field (including a fringing field) such as an in-plane switching (IPS) mode has been put into practical use. Such a liquid crystal display device of the lateral electric field mode comprises a pixel electrode and a common electrode formed on one of substrates.

Technology of widening a viewing angle and enhancing visibility by forming a multi domain, in the liquid crystal display device of the lateral electric field mode, is known. For example, technology by which, while each of pixels forms a single domain, a multi-domain effect can be obtained by forming mutually different domains, particularly, mutually symmetrical domains between two pixels adjacent in a perpendicular direction, is known.

DETAILED DESCRIPTION

In general, according to one embodiment, a liquid crystal display device comprises: a first substrate comprising a first pixel electrode, a second pixel electrode adjacent to the first pixel electrode in a first direction, and a third pixel electrode adjacent to the second pixel electrode in the first direction; a second substrate comprising a first color filter opposed to the first pixel electrode, a second color filter of a color different from a color of the first color filter, which is opposed to the second pixel electrode, and a third color filter of a color different from the colors of the first and second color filters, which is opposed to the third pixel electrode; and a liquid crystal layer held between the first substrate and the second substrate, a first interval along the first direction between the first pixel electrode and the second pixel electrode being smaller than a second interval along the first direction between the second pixel electrode and the third pixel electrode.

According to another embodiment, a liquid crystal display device comprises: a first substrate comprising first to fourth source lines arranged in a first direction, a first pixel electrode located between the first source line and the second source line to be close to the first source line, a second pixel electrode located at a middle position between the second source line and the third source line, and a third pixel electrode located between the third source line and the fourth source line to be close to the fourth source line; a second substrate comprising a first color filter opposed to the first pixel electrode, a second color filter of a color different from a color of the first color filter, which is opposed to the second pixel electrode, and a third color filter of a color different from the colors of the first and second color filters, which is opposed to the third pixel electrode; and a liquid crystal layer held between the first substrate and the second substrate.

The embodiments will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape, etc., of each portion as compared with an actual aspect, but they are mere examples and do not restrict the interpretation of the invention. In the present specification and drawings, elements like or similar to those in the already described drawings may be denoted by similar reference numbers and their detailed descriptions may be arbitrarily omitted.

Figure 1:
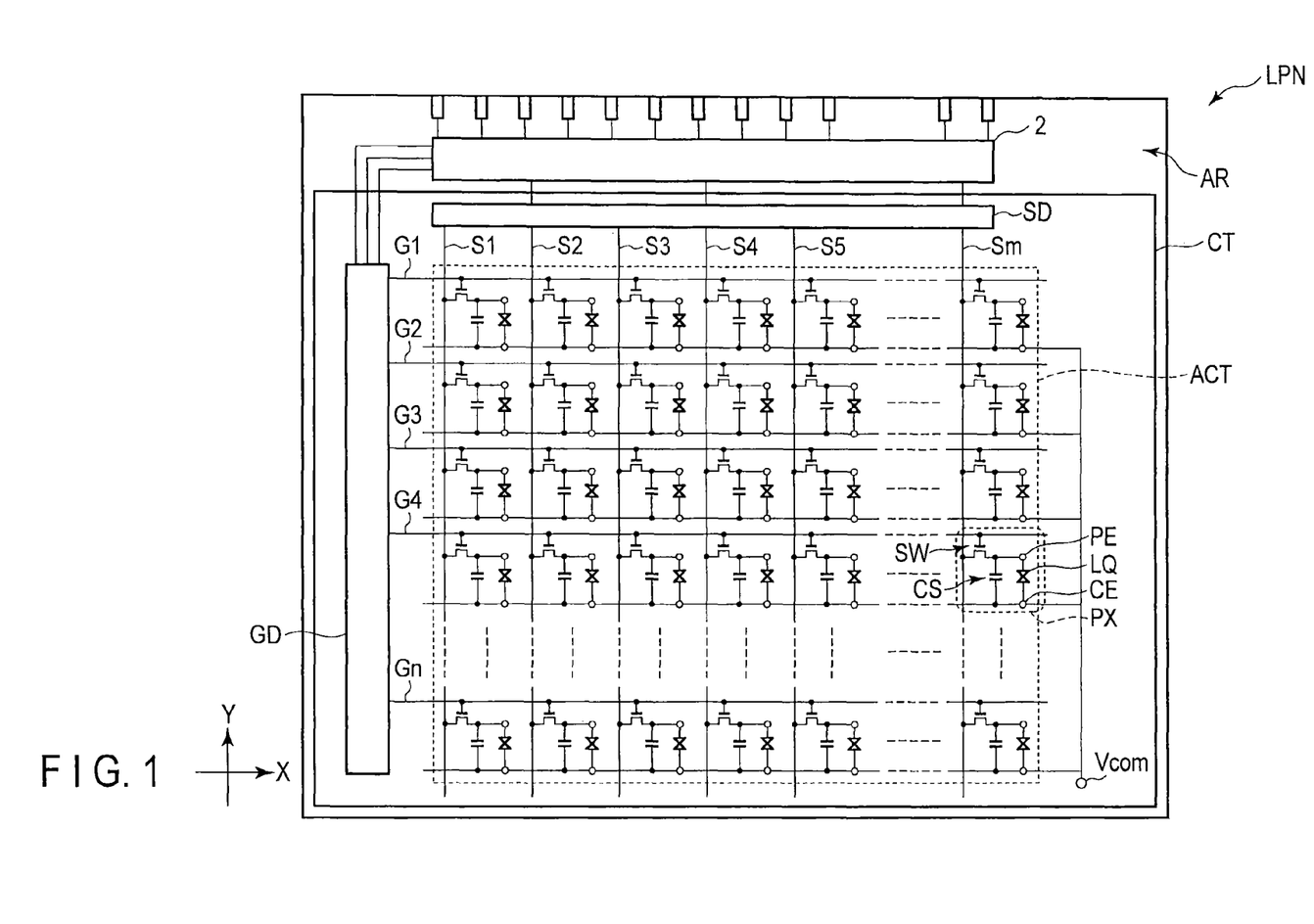
FIG. 1 is a view schematically showing a configuration and an equivalent circuit, of a liquid crystal display panel LPN constituting a display device of embodiments.

FIG. 1 is a view schematically showing a configuration and an equivalent circuit, of a liquid crystal display panel LPN which constitutes a display device of the embodiments.

More specifically, the liquid crystal display device comprises a liquid crystal display panel LPN of an active-matrix type. The liquid crystal display panel LPN comprises an array substrate AR which is a first substrate, a counter-substrate CT which is a second substrate disposed to be opposed to the array substrate AR, and a liquid crystal layer LQ held between the array substrate AR and the counter-substrate CT. The liquid crystal display panel LPN includes an active area ACT where an image is displayed. The active area ACT corresponds to a region where the liquid crystal layer LQ is held between the array substrate AR and the counter-substrate CT, has a rectangular shape, for example, and is composed of a plurality of pixels PX arrayed in a matrix.

The array substrate AR includes, in the active area ACT, gate lines G (G1 to Gn), source lines S (S1 to Sm), a switching element SW, a pixel electrode PE, a common electrode CE, etc. The gate lines G (G1 to Gn) are extended in a first direction X and arranged in a second direction Y intersecting the first direction X. The source lines S (S1 to Sm) are substantially extended in the second direction Y and arranged in the first direction X. It should be noted that, more strictly, the source lines S are bended in accordance with a pixel layout or a pixel shape as explained below. The switching element SW is electrically connected with the gate line G and the source line S in each pixel PX. The pixel electrode PE is formed in an island shape in each pixel PX, and is electrically connected to the switching element SW. The common electrode CE is formed commonly across a plurality of pixels PX and is opposed to the pixel electrode PE, in the active area ACT. A storage capacitor CS is formed, for example, between the common electrode CE and the pixel electrode PE.

Each of the gate lines G is led to the outside of the active area ACT and is connected to a first driving circuit GD. Each of the source lines S is led to the outside of the active area ACT and is connected to a second driving circuit SD. At least parts of the first driving circuit GD and second driving circuit SD are formed on, for example, the array substrate AR, and are connected with a driving IC chip 2. The driving IC chip 2 incorporates a controller which controls the first driving circuit GD and the second driving circuit SD, and functions as a signal supply source which supplies signals necessary for driving the liquid crystal display panel LPN. In the example illustrated, the driving IC chip 2 is mounted on the array substrate AR, on the outside of the active area ACT. The common electrode CE is led to the outside of the active area ACT and is connected to a power supply module Vcom. The power supply module Vcom supplies a common potential to the common electrode CE.

Figure 2:
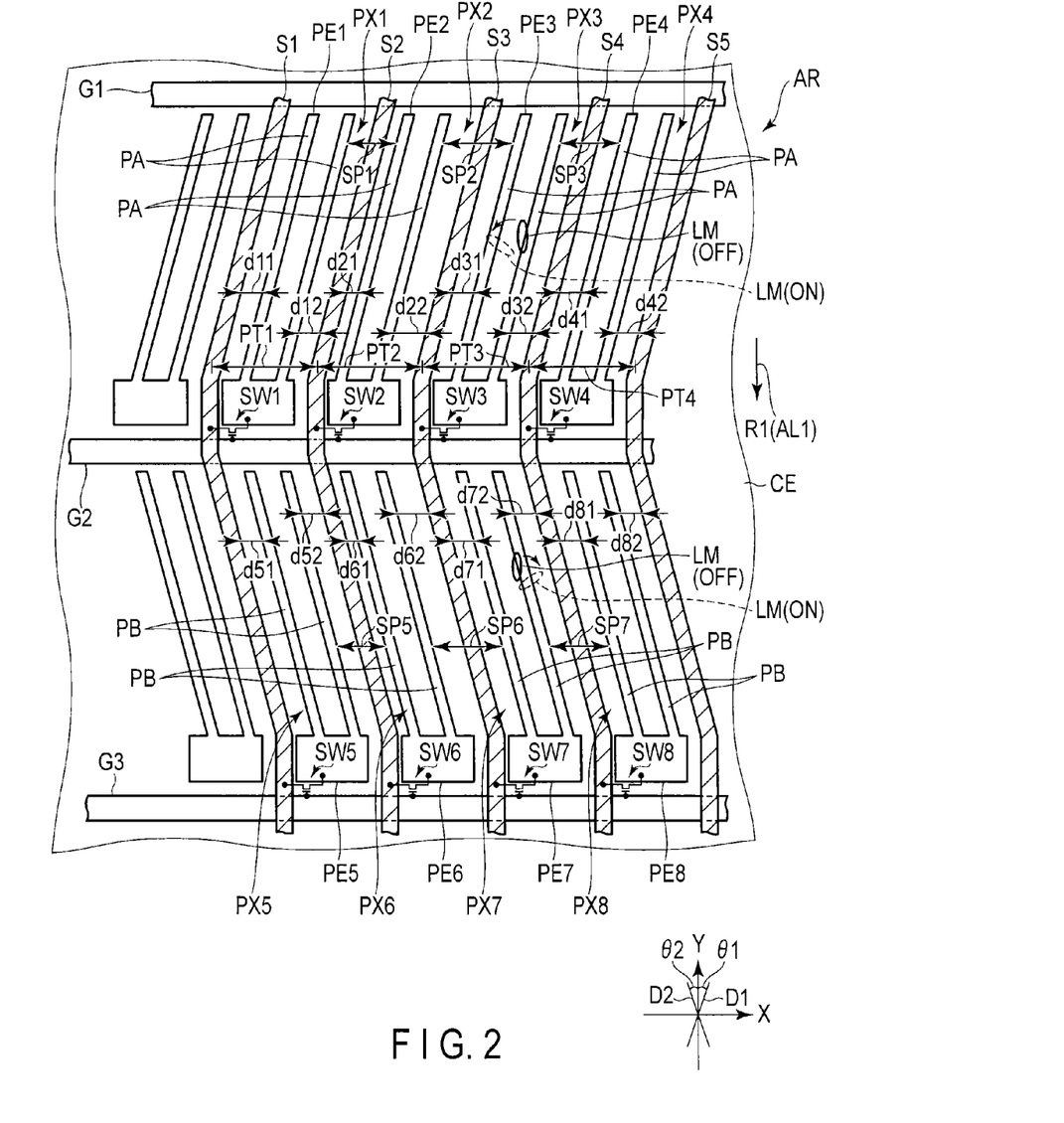
FIG. 2 is a schematic plan view showing a first configuration example of pixels in an array substrate AR shown in FIG. 1 as seen from a counter-substrate side.

FIG. 2 is a schematic plan view showing a first configuration example of pixels in an array substrate AR shown in FIG. 1 as seen from a counter-substrate side. A pixel structure to which the FFS mode is applied is exemplified, and main portions necessary for explanations alone are illustrated in the drawing.

The array substrate AR comprises gate lines G1 to G3, source lines S1 to S5, switching elements SW1 to SW8, the common electrode CE, pixel electrodes PE1 to PE8, a first alignment film AL1, etc.

Each of the gate lines G1 to G3 is extended along the first direction X. Each of the source lines S1 to S5 is substantially extended along the second direction Y and crosses the gate lines G1 to G3. Pixels PX1 to PX8 are sectioned by the gate lines G1 to G3 and the source lines S1 to S5.

A unit pixel for implementing color display is composed of a plurality of different color pixels. The unit pixel is a minimum unit that constitutes a color image displayed on the active area. In the example illustrated, the unit pixel is composed of three color pixels, i.e., a blue (B) pixel, a red (R) pixel, and a green (G) pixel.

The pixels PX1 to PX3 arranged in the first direction X are color pixels of different colors, and the pixels PX5 to PX7 are also color pixels of different colors. The pixels PX1 and PX5 arranged in the second direction Y are pixels of the same color and, for example, blue pixels. The pixels PX2 and PX6 arranged in the second direction Y are pixels of the same color and, for example, red pixels. The pixels PX3 and PX7 arranged in the second direction Y are pixels of the same color and, for example, green pixels. In the example illustrated, the pixel PX4 is a pixel of the same color as the pixel PX1, and the pixel PX8 is a pixel of the same color as the pixel PX5. The pixels PX1 and PX5 arranged in the second direction Y may be pixels of different colors and, for example, one of the pixels may be a blue pixel and the other pixel may be a white pixel.

The pixel PX1 is defined by the gate line G1, the gate line G2, the source line S1 and the source line S2. The pixel PX2 is defined by the gate line G1, the gate line G2, the source line S2 and the source line S3. The pixel PX3 is defined by the gate line G1, the gate line G2, the source line S3 and the source line S4. The pixel PX4 is defined by the gate line G1, the gate line G2, the source line S4 and the source line S5.

The pixels PX1 to PX4 are extended in a first extending direction D1 that intersects the second direction Y clockwise at an acute angle. Each of the source lines S1 to S5 located on both sides of the pixels PX1 to PX4 is extended in the first extending direction D1.

The pixel PX5 is defined by the gate line G2, the gate line G3, the source line S1 and the source line S2. The pixel PX6 is defined by the gate line G2, the gate line G3, the source line S2 and the source line S3. The pixel PX7 is defined by the gate line G2, the gate line G3, the source line S3 and the source line S4. The pixel PX8 is defined by the gate line G2, the gate line G3, the source line S4 and the source line S5. The pixels PX5 to PX8 are extended in a second extending direction D2 that intersects the second direction Y counterclockwise at an acute angle. Each of the source lines S1 to S5 located on both sides of the pixels PX5 to PX8 is extended in the second extending direction D2. It should be noted that an angle θ1 made between the second direction Y and the first extending direction D1 is substantially the same as an angle θ2 made between the second direction Y and the second extending direction D2.

The common electrode CE is extended over a substantially entire region of the array substrate AR and formed commonly to the pixels PX1 to PX8. In other words, the common electrode CE is extended in the second direction Y over the gate lines G1 to G3, extended in the first direction X over the source lines S1 to S5, and disposed in each of the pixels PX1 to PX8. In the common electrode CE, an opening portion for making electric connection between the pixel electrode and the switching element is formed at each element though not described in detail.

The pixel PX1 comprises the switching element SW1 and the pixel electrode PE1. The switching element SW1 is electrically connected with the gate line G2 and the source line S1. The pixel electrode PE1 is located between the source line S1 and the source line S2, and connected to the switching element SW1.

The pixel PX2 comprises the switching element SW2 and the pixel electrode PE2. The switching element SW2 is electrically connected with the gate line G2 and the source line S2. The pixel electrode PE2 is located between the source line S2 and the source line S3, and connected to the switching element SW2.

The pixel PX3 comprises the switching element SW3 and the pixel electrode PE3. The switching element SW3 is electrically connected with the gate line G2 and the source line S3. The pixel electrode PE3 is located between the source line S3 and the source line S4, and connected to the switching element SW3.

The pixel PX4 comprises the switching element SW4 and the pixel electrode PE4. The switching element SW4 is electrically connected with the gate line G2 and the source line S4. The pixel electrode PE4 is located between the source line S4 and the source line S5, and connected to the switching element SW4.

Similarly, the pixel PX5 comprises the switching element SW5 which is electrically connected with the gate line G3 and the source line S1, and the pixel electrode PE5 which is connected to the switching element SW5. The pixel PX6 comprises the switching element SW6 which is electrically connected with the gate line G3 and the source line S2, and the pixel electrode PE6 which is connected to the switching element SW6. The pixel PX7 comprises the switching element SW7 which is electrically connected with the gate line G3 and the source line S3, and the pixel electrode PE7 which is connected to the switching element SW7. The pixel PX8 comprises the switching element SW8 which is electrically connected with the gate line G3 and the source line S4, and the pixel electrode PE8 which is connected to the switching element SW8.

Each of the switching elements SW1 to SW8 is, for example, a thin-film transistor (TFT). Each of the pixel electrodes PE1 to PE8 is opposed to the common electrode CE.

Each of the pixel electrodes PE1 to PE4 is formed in an island shape corresponding to the pixel shape extending in the first extending direction D1. In addition, each of the pixel electrodes PE1 to PE4 includes at least one strip electrode PA. The strip electrodes PA of the respective pixel electrodes PE1 to PE4 are extended in directions parallel to each other. For example, each of the pixel electrodes PE1 to PE4 includes an equal number of strip electrodes PA. In the example illustrated, each of the strip electrodes PA is extended in the first extending direction D1. In addition, each of the pixel electrodes PE1 to PE4 includes two strip electrodes PA arranged in the first direction X.

Each of the pixel electrodes PE5 to PE8 is formed in an island shape corresponding to the pixel shape expending in the second extending direction D2. In addition, each of the pixel electrodes PE5 to PE8 includes at least one strip electrode PB. In the example illustrated, the strip electrode PB is extended in the second extending direction D2. Each of the pixel electrodes PE5 to PE8 includes two strip electrodes PB arranged in the first direction X.

The first alignment film AL1 is subjected to alignment treatment along a direction intersecting a major axis of the strip electrode PA (i.e., the first extending direction D1 in the example shown in FIG. 2) and a major axis of the strip electrode PB (i.e., the second extending direction D2 in the example shown in FIG. 2) at an acute angle smaller than or equal to 45 degrees. An alignment treatment direction R1 of the first alignment film AL1 is a direction which is parallel to the second direction Y and which intersects the first extending direction D1 or the second extending direction D2.

The pixels PX1 to PX4 are noted here. A pitch PT1 between the source line S1 and the source line S2, a pitch PT2 between the source line S2 and the source line S3, a pitch PT3 between the source line S3 and the source line S4, and a pitch PT4 between the source line S4 and the source line S5 are substantially equal to each other. Widths along the first direction X of the pixel electrodes PE1 to PE4 are substantially equal to each other. The strip electrodes PA of each of the pixel electrodes PE1 to PE4 have substantially equal widths along the first direction X.

In the pixel electrode PE1, intervals d11 and d12 along the first direction X are set between the strip electrode PA on the one-end side and the source line S1, and between the strip electrode PA on the other end side and the source line S2, respectively. The interval d11 corresponds to an interval along the first direction X between the pixel electrode PE1 and the source line S1, and the interval d12 corresponds to an interval along the first direction X between the pixel electrode PE1 and the source line S2.

In the pixel electrode PE2, intervals d21 and d22 along the first direction X are set between the strip electrode PA on the one-end side and the source line S2, and between the strip electrode PA on the other end side and the source line S3, respectively. The interval d21 corresponds to an interval along the first direction X between the pixel electrode PE2 and the source line S2, and the interval d22 corresponds to an interval along the first direction X between the pixel electrode PE2 and the source line S3.

In the pixel electrode PE3, intervals d31 and d32 along the first direction X are set between the strip electrode PA on the one-end side and the source line S3, and between the strip electrode PA on the other end side and the source line S4, respectively. The interval d31 corresponds to an interval along the first direction X between the pixel electrode PE3 and the source line S3, and the interval d32 corresponds to an interval along the first direction X between the pixel electrode PE3 and the source line S4.

In the pixel electrode PE4, intervals d41 and d42 along the first direction X are set between the strip electrode PA on the one-end side and the source line S4, and between the strip electrode PA on the other end side and the source line S5, respectively. The interval d41 corresponds to an interval along the first direction X between the pixel electrode PE4 and the source line S4, and the interval d42 corresponds to an interval along the first direction X between the pixel electrode PE4 and the source line S5.

The interval d11, the interval d12, the interval d31, the interval d32, the interval d41, and the interval d42 are substantially equal to each other. The interval d21 is smaller than the interval d22. Furthermore, the interval d21 is smaller than the interval d11, etc. In contrast, the interval d22 is greater than the interval d11, etc. In other words, an interval SP1 along the first direction X between the pixel electrode PE1 and the pixel electrode PE2 is smaller than an interval SP2 along the first direction X between the pixel electrode PE2 and the pixel electrode PE3. The strip electrodes PA of the pixel electrode PE2 are disposed to be closer to the strip electrodes PA of the pixel electrode PE1 than to the strip electrodes PA of the pixel electrode PE3. Alternatively, the pixel electrode PE2 is disposed to be closer to the pixel electrode PE1 than to the pixel electrode PE3. It should be noted that an interval SP3 along the first direction X between the pixel electrode PE3 and the pixel electrode PE4 is greater than the interval SP1 along the first direction X between the pixel electrode PE1 and the pixel electrode PE2 and is smaller than the interval SP2 along the first direction X between the pixel electrode PE2 and the pixel electrode PE3.

The pixels PX5 to PX8 have the same relationship as the above-described relationship among the pixels PX1 to PX4.

Widths along the first direction X of the pixel electrodes PE5 to PE8 are substantially equal to each other. The strip electrodes PB of each of the pixel electrodes PE5 to PE8 have substantially equal widths along the first direction X.

In the pixel electrode PE5, intervals d51 and d52 along the first direction X are set between the strip electrode PB on the one-end side and the source line S1, and between the strip electrode PB on the other end side and the source line S2, respectively. In the pixel electrode PE6, intervals d61 and d62 along the first direction X are set between the strip electrode PB on the one-end side and the source line S2, and between the strip electrode PB on the other end side and the source line S3, respectively. In the pixel electrode PE7, intervals d71 and d72 along the first direction X are set between the strip electrode PB on the one-end side and the source line S3, and between the strip electrode PB on the other end side and the source line S4, respectively. In the pixel electrode PE8, intervals d81 and d82 along the first direction X are set between the strip electrode PB on the one-end side and the source line S4, and between the strip electrode PB on the other end side and the source line S5, respectively.

The interval d51, the interval d52, the interval d71, the interval d72, the interval d81, and the interval d82 are substantially equal to each other. The interval d61 is smaller than the interval d62. Furthermore, the interval d61 is smaller than the interval d51, etc. In contrast, the interval d62 is greater than the interval d51, etc. In other words, an interval SP5 along the first direction X between the pixel electrode PE5 and the pixel electrode PE6 is smaller than an interval SP6 along the first direction X between the pixel electrode PE6 and the pixel electrode PE7. The strip electrodes PB of the pixel electrode PE6 are disposed to be closer to the strip electrodes PB of the pixel electrode PE5 than to the strip electrodes PB of the pixel electrode PE7. Alternatively, the pixel electrode PE6 is disposed to be closer to the pixel electrode PE5 than to the pixel electrode PE7. It should be noted that an interval SP7 along the first direction X between the pixel electrode PE7 and the pixel electrode PE8 is greater than the interval SP5 along the first direction X between the pixel electrode PE5 and the pixel electrode PE6 and is smaller than the interval SP6 along the first direction X between the pixel electrode PE6 and the pixel electrode PE7.

Figure 3:
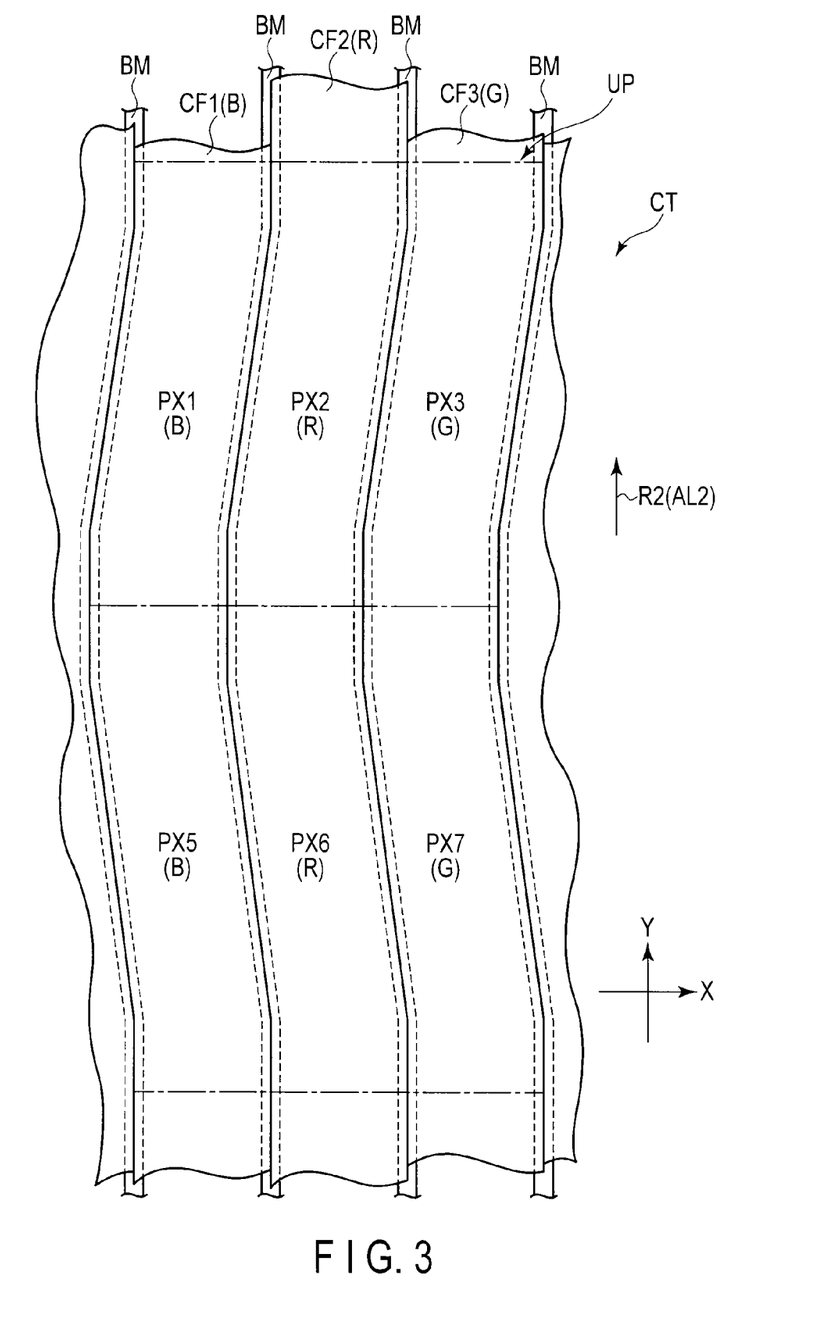
FIG. 3 is a plan view schematically showing an example of a layout of each pixel and color filters in the embodiments.

FIG. 3 is a plan view schematically showing an example of a layout of each pixel and color filters in the embodiments.

The counter-substrate CT comprises light-shielding layers BM, color filters CF1 to CF3, a second alignment film AL2, etc.

The light-shielding layers BM are disposed at boundaries of the respective pixels. In other words, the light-shielding layers BM are located above the source lines and the gate lines shown in FIG. 2. It should be noted that the light-shielding layer BM may be not disposed at a boundary between the pixels of the same color, but is disposed at a boundary between the pixels of different colors.

The color filter (first color filter) CF1 is formed in a strip shape extending along the second direction Y. The color filter (second color filter) CF2 is adjacent to the color filter CF1 in the first direction X, and is formed in a strip shape extending along the second direction Y. The color filter (third color filter) CF3 is adjacent to the color filter CF2 in the first direction X, and is formed in a strip shape extending along the second direction Y.

The color filter CF1 is disposed to correspond to the pixel PX1 and the pixel PX5. The color filter CF2 is disposed to correspond to the pixel PX2 and the pixel PX6. The color filter CF3 is disposed to correspond to the pixel PX3 and the pixel PX7. In the example illustrated, the color filter CF1 is a blue (B) color filter, the color filter CF2 is a red (R) color filter, and the color filter CF3 is a green (G) color filter. The color filters CF1 to CF3 have mutually adjacent end portions overlapping the light-shielding layers BM.

The second alignment film AL2 is subjected to alignment treatment along a direction parallel to the alignment treatment direction R1 of the first alignment film AL1. An alignment treatment direction R2 of the second alignment film AL2 is, for example, mutually opposed to the alignment treatment direction R1 of the first alignment film AL1.

Figure 4:
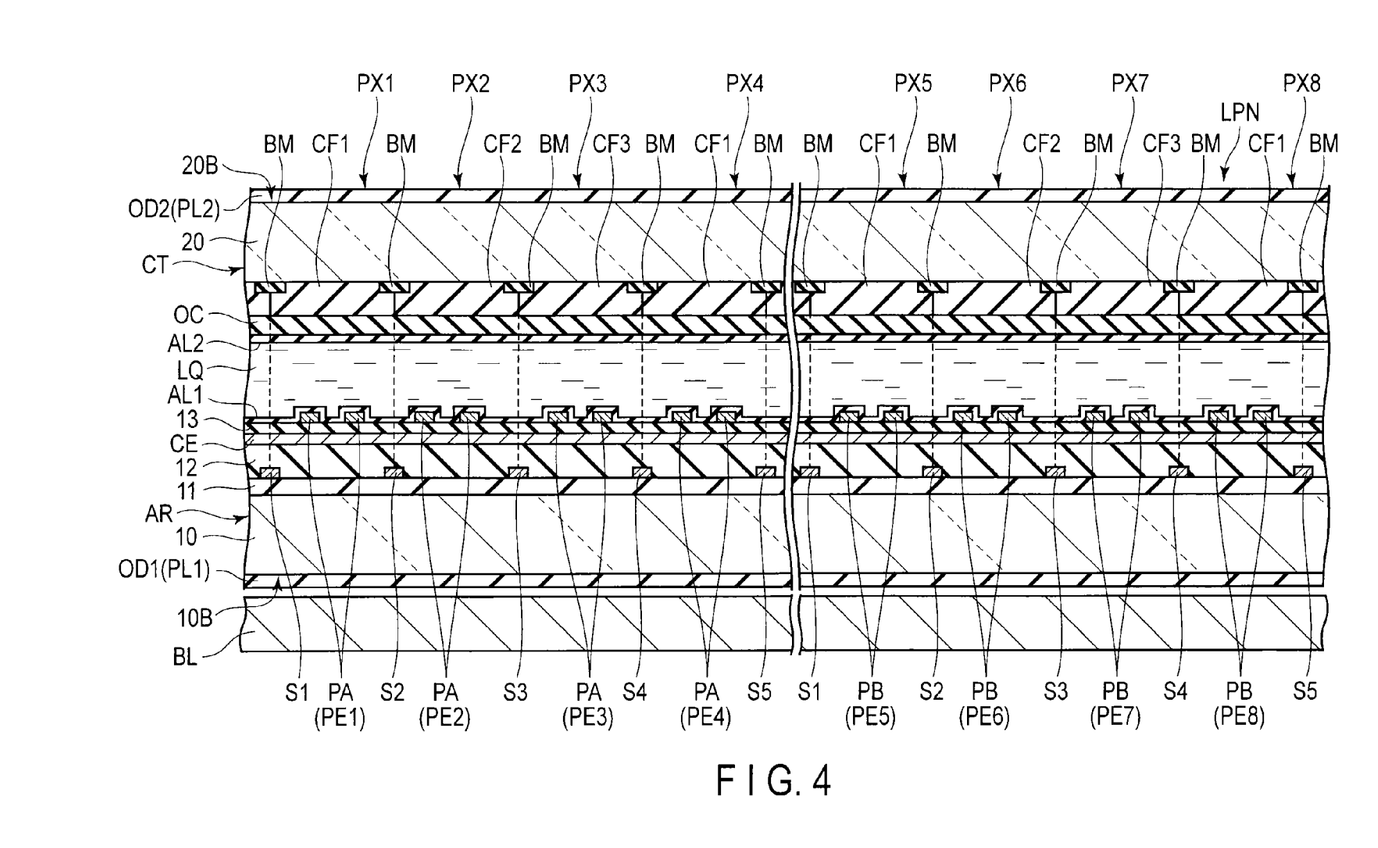
FIG. 4 is a cross-sectional view schematically showing a configuration of the liquid crystal display panel LPN comprising pixels PX1 to PX8 shown in FIG. 2.

FIG. 4 is a cross-sectional view schematically showing a configuration of the liquid crystal display panel LPN comprising the pixels PX1 to PX8 shown in FIG. 2.

The array substrate AR is formed by using a first insulating substrate 10 having light transmissivity, such as a glass substrate and a resin substrate. The array substrate AR comprises the source lines S1 to S5, the common electrode CE, the pixel electrodes PE1 to PE8, a first insulating film 11, a second insulating film 12, a third insulating film 13, the first alignment film AL1, etc., besides the switching elements and the gate lines (not shown), on a side of the first insulating substrate 10 which is opposed to the counter-substrate CT.

The source lines S1 to S5 are formed on the first insulating film 11 and covered with the second insulating film 12. It should be noted that the gate lines are formed between the first insulating substrate 10 and the first insulating film 11. The common electrode CE is formed on the second insulating film 12 and covered with the third insulating film 13. The common electrode CE is formed of a transparent conductive material, for example, indium tin oxide (ITO), indium zinc oxide (IZO), etc.

The pixel electrodes PE1 to PE8 are formed on the third insulating film 13 and opposed to the common electrode CE. In other words, the strip electrode PA of each of the pixel electrodes PE1 to PE4 and the strip electrode PB of each of the pixel electrodes PE5 to PE8 are located above the common electrode CE through the third insulating film 13. The third insulating film 13 is regarded as an interlayer insulating film which is interposed between the common electrode CE and the pixel electrodes PE1 to PE8. The pixel electrode PE1 and the pixel electrode PE5 are located between the source line S1 and the source line S2. The pixel electrode PE2 and the pixel electrode PE6 are located between the source line S2 and the source line S3. The pixel electrode PE3 and the pixel electrode PE7 are located between the source line S3 and the source line S4. The pixel electrode PE4 and the pixel electrode PE8 are located between the source line S4 and the source line S5. Each of the pixel electrodes PE1 to PE8 is formed of a transparent conductive material, for example, ITO, IZO, etc. The pixel electrodes PE1 to PE8 are covered with the first alignment film AL1. The first alignment film AL1 also covers the third insulating film 13. The first alignment film AL1 is formed of a material having a horizontal alignment property and is disposed on a surface of the array substrate AR which is in contact with the liquid crystal layer LQ.

In contrast, the counter-substrate CT is formed by using a second insulating substrate 20 having light transmissivity, such as a glass substrate and a resin substrate. The counter-substrate CT comprises the light-shielding layers BM, the color filters CF1 to CF3, an overcoat layer OC, the second alignment film AL2, etc., on a side of the second insulating substrate 20 which is opposed to the array substrate AR.

The light-shielding layers BM are formed on an inner surface of the second insulating substrate 20. The light-shielding layers BM are located above the source lines S1 to S5, respectively. The light-shielding layers BM are formed of a black resin material or a light-shielding metal material.

Each of the color filters CF1 to CF3 is formed on an inner surface of the second insulating substrate 20. The color filter CF1 is opposed to the pixel electrode PE1, the pixel electrode PE4, the pixel electrode PE5, and the pixel electrode PE8. The color filter CF2 is opposed to the pixel electrode PE2 and the pixel electrode PE6. The color filter CF3 is opposed to the pixel electrode PE3 and the pixel electrode PE7. The color filter CF1 is formed of a blue-colored resin material. The color filter CF2 is formed of a red-colored resin material. The color filter CF3 is formed of a green-colored resin material.

The overcoat layer OC covers the color filters CF1 to CF3. The overcoat layer OC flattens unevenness of the surfaces of the color filters CF1 to CF3. The overcoat layer OC is formed of a transparent resin material. The overcoat layer OC is covered with the second alignment film AL2. The second alignment film AL2 is formed of a material having a horizontal alignment property and is disposed on a surface of the counter-substrate CT which is in contact with the liquid crystal layer LQ.

The array substrate AR and the counter-substrate CT as explained above are disposed such that the first alignment film AL1 and the second alignment film AL2 face each other. At this time, a predetermined cell gap is formed between the array substrate AR and the counter-substrate CT by a columnar spacer formed on either of the substrates. The array substrate AR and the counter-substrate CT are bonded to each other by a sealing member in a state in which the cell gap is formed. The liquid crystal layer LQ is formed of a liquid crystal material containing the liquid crystal molecules LM sealed in the cell gap between the first alignment film AL1 and the second alignment film AL2.

A backlight unit BL is disposed on a back surface side of the liquid crystal display panel LPN. Various types of backlight units can be applied as the backlight unit BL, but explanation of a detailed structure of the backlight unit BL is omitted here.

A first optical element OD1 including a first polarizer PL1 is disposed on an outer surface 10B of the first insulating substrate 10. A second optical element OD2 including a second polarizer PL2 is disposed on an outer surface 20B of the second insulating substrate 20. The first polarizer PL1 and the second polarizer PL2 are disposed to be, for example, in a cross-Nicol positional relationship in which axes of the respective polarizers cross each other at right angles.

Next, operations of the liquid crystal display device having the above-described configuration will be explained.

At an OFF time at which a voltage for forming a potential difference is not applied between the pixel electrode PE and the common electrode CE, the voltage is not applied to the liquid crystal layer LQ and an electric field is not formed between the pixel electrode PE and the common electrode CE. For this reason, the liquid crystal molecules LM included in the liquid crystal layer LQ are initially aligned in an X-Y plane by an alignment restriction force of the first alignment film AL1 and the second alignment film AL2, as illustrated by a solid line in FIG. 2. In other words, the initial alignment direction of the liquid crystal molecules LM is parallel to the second direction Y. At the OFF time, part of the light from the backlight unit BL passes through the first polarizer PL1 and enters the liquid crystal display panel LPN. The light incident on the liquid crystal display panel LPN is linearly polarized light orthogonal to, for example, a first absorption axis of the first polarizer PL1. Such a polarized state of the linearly polarized light is hardly varied when the light passes through the liquid crystal display panel LPN at the OFF time. For this reason, most part of the linearly polarized light passing through the liquid crystal display panel LPN is absorbed by the second polarizer PL2 (black display).

In contrast, at an ON time at which a voltage for forming a potential difference is applied between the pixel electrode PE and the common electrode CE, the voltage is applied to the liquid crystal layer LQ and the fringing field is formed between the pixel electrode PE and the common electrode CE. For this reason, the liquid crystal molecules LM are aligned in an orientation different from the initial alignment direction in the X-Y plane, as illustrated by a broken line in FIG. 2. In a positive-type liquid crystal material, for example, the liquid crystal molecules LM of the pixel PX3 are rotated counterclockwise to be aligned in a direction approximately parallel to the fringing field, in the X-Y plane, and the liquid crystal molecules LM of the pixel PX7 are rotated clockwise to be aligned in a direction approximately parallel to the fringing field, in the X-Y plane. At this time, the liquid crystal molecules LM are aligned in accordance with a magnitude of the electric field. At the ON time, linearly polarized light orthogonal to the first absorption axis of the first polarizer PL1 is made incident on the liquid crystal display panel LPN, and the polarized state is varied in accordance with the aligned state of the liquid crystal molecules LM when the light passes through the liquid crystal layer LQ. For this reason, at least part of the linearly polarized light passing through the liquid crystal layer LQ is transmitted through the second polarizer PL2 (white display).

In such a configuration, a normally black mode is implemented.

The colors of the color filters CF disposed on the pixels in the ON state are visually recognized when the liquid crystal display panel LPN is observed vertically from the counter-substrate CT side. However, when the liquid crystal display panel LPN is observed obliquely from the counter-substrate CT side, mixture of the colors of the color filters CF on the pixels in the ON state with the colors of the other color filters CF adjacent to the color filters CF is often visually recognized. This phenomenon is called color mixture.

The color mixture is caused by the light incident obliquely to the liquid crystal display panel LPN, which is modulated at passing through the liquid crystal layer LQ in the ON state between the pixels of different colors. In other words, the color mixture can be further suppressed as the region in which the liquid crystal molecules are maintained in the initial alignment state, i.e., the region of the liquid crystal layer LQ in the OFF state, between the pixels of different colors, is wider.

As a method of widening the region of the liquid crystal layer LQ in the OFF state, an interval along the first direction X between the pixel electrode PE opposed to a desired color filter CF and the pixel electrode opposed to the color filter CF where the color mixture is troublesome is set to be wider.

In the first configuration example, the color mixture in the unit pixel UP is suppressed by making the pixel electrode PE, which is disposed in any one of three pixels PX disposed at equal pitches in the unit pixel UP, close to the other pixel electrode PE adjacent in the first direction X.

Figure 5:
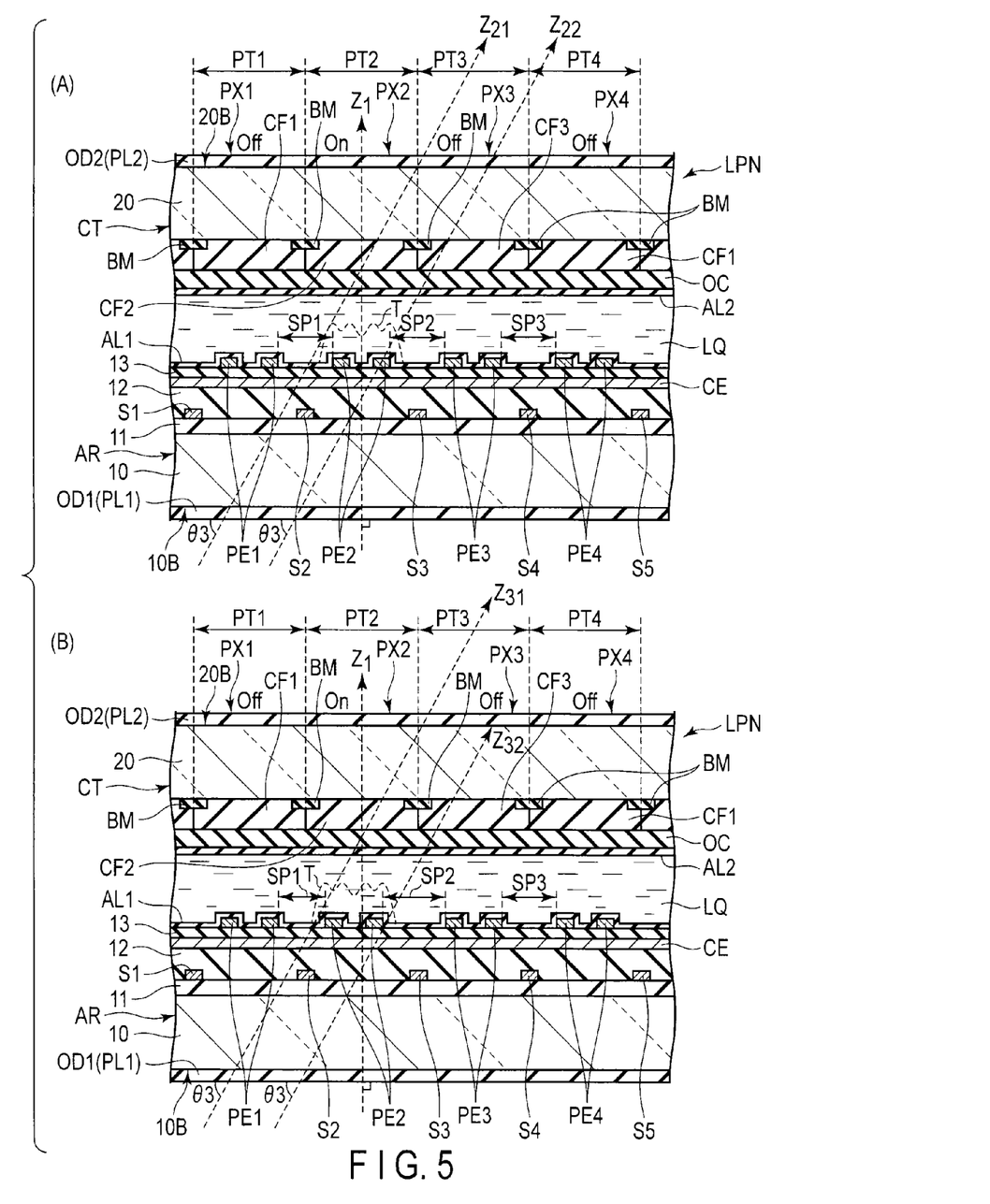
FIG. 5 shows cross-sectional views illustrating examples of display states of the liquid crystal display panel LPN of the first configuration example and a comparative example.

FIG. 5 show cross-sectional views illustrating examples of the display state of the liquid crystal display panel LPN of the first configuration example and a comparative example.

Each of the pixel PX1 and the pixel PX4 is a color pixel comprising the blue color filter CF1(B), the pixel PX2 is a color pixel comprising the red color filter CF2(R), and the pixel PX3 is a color pixel comprising the green color filter CF3(G).

(A) in the figure indicates the liquid crystal display panel LPN of the comparative example. In the comparative example, the interval SP1 between the pixel electrode PE1 and the pixel electrode PE2, the interval SP2 between the pixel electrode PE2 and the pixel electrode PE3, and the interval SP3 between the pixel electrode PE3 and the pixel electrode PE4 are equal to each other. For example, each of the intervals SP1 to SP3 is 12.7 μm. (B) in the figure indicates the liquid crystal display panel LPN of the first configuration example. In the first configuration example, the interval SP1 between the pixel electrode PE1 and the pixel electrode PE2, the interval SP2 between the pixel electrode PE2 and the pixel electrode PE3, and the interval SP3 between the pixel electrode PE3 and the pixel electrode PE4 has a relationship SP2>SP3>SP1. For example, the interval SP1 is 11.7 µm, the interval SP2 is 13.7 µm, and the interval SP3 is 12.7 µm. It should be noted that the pitches PT1 to PT4 are constant in the comparative example and the first configuration. For example, each of the pitches PT1 to PT4 is 19 µm.

The liquid crystal display panel LPN of each of the comparative example and the first configuration example shown in the figure displays red color alone. In other words, since the pixel PX2 alone is in the ON state on the liquid crystal display panel LPN of each of the examples, the fringing field is formed between the pixel electrode PE2 and the common electrode CE. In the region affected by the fringing field, the liquid crystal molecules of the liquid crystal layer LQ are aligned in a direction different from the initial alignment direction.

In the comparative example shown in (A), the fringing field formed when the pixel PX2 is in the ON state is extended to the vicinity of the boundary between the pixel PX2 and the pixel PX1 and the boundary between the pixel PX2 and the pixel PX3, and affects the liquid crystal molecules in their regions. In other words, transmissivity distribution T in the pixel PX2 is extended to the regions close to the respective pixel PX1 and pixel PX3 as represented by broken lines in the figure.

In the liquid crystal display panel LPN of the comparative example, light Z1 which has passed through the liquid crystal layer LQ on the pixel electrode PE2, of the light made incident perpendicularly on the first polarizer PL1, passes through the red color filter CF2 on the pixel electrode PE2 and then transmits the second polarizer PL2. For this reason, the red transmitted light (Z1) is visually recognized as a single color when the liquid crystal display panel LPN is observed vertically from the counter-substrate CT side.

In contrast, light Z21 which has passed through the liquid crystal layer LQ on the pixel electrode PE2 and then passed through the color filter CF2, of the light (for example, angle of incidence θ3) made incident obliquely on the first polarizer PL1, passes through the second polarizer PL2 and becomes red transmitted light. Light Z22 which has passed through the liquid crystal layer LQ in the vicinity of the boundary between the pixel PX2 and the pixel PX3 and then passed through the green color filter CF3 on the pixel electrode PE3, of the light made incident at the angle of incidence θ3, passes through the second polarizer PL2 and becomes green transmitted light. The angle of incidence θ3 is set to be greater than or equal to zero and less than 90 degrees. In other words, when the liquid crystal display panel LPN of the comparative example is observed from an oblique direction inclined by the angle Σ3 to the normal direction, the color is visually recognized as yellow green or orange color since the red transmitted light Z21 is mixed with the green transmitted light Z22. When the pitches SP1 to SP3 are constant, the color mixture between the blue pixel PX1 and the red pixel PX2 may occur or the color mixture between the green pixel PX3 and the blue pixel PX4 may occur.

In contrast, in the liquid crystal display panel LPN of the first configuration example shown in (B), the interval SP2 between the pixel electrode PE2 and the pixel electrode PE3 is set to be greater than that in the comparative example. For this reason, the fringing field formed when the pixel PX2 is in the ON state is extended to the vicinity of the boundary between the pixel PX2 and the pixel PX1, but can suppress extension of the fringing field to the boundary between the pixel PX2 and the pixel PX3. In other words, the alignment state of liquid crystal molecules can be maintained in the initial alignment state in the vicinity of the boundary between the pixel PX2 and the pixel PX3. For this reason, transmissivity distribution T in the pixel PX2 is extended to the region close to the pixel PX1 as represented by the broken line in the figure while including the region of a low transmissivity region between the pixel PX2 and the PX3.

In the liquid crystal display panel LPN of the first configuration example, the light Z1 which has passed through the liquid crystal layer LQ on the pixel electrode PE2, of the light made incident perpendicularly on the first polarizer PL1, is visually recognized as the red transmitted light, similarly to the comparative example.

Light Z31 which has passed through the red color filter CF2 after passing through the liquid crystal layer LQ on the pixel electrode PE2, of the light made incident obliquely on the first polarizer PL1, passes through the second polarizer PL2 and becomes red transmitted light. In contrast, light Z32 which passes through the liquid crystal layer LQ in the vicinity of the boundary between the pixel PX2 and the pixel PX3, of the light made incident at the same angle of incidence θ3, is hardly modulated by the liquid crystal layer LQ, but passes through the color filter CF3 on the pixel electrode PE3 and reaches the second polarizer PL2. In other words, the incident light Z32 is absorbed by the second polarizer PL2 since the incident light Z32 reaches the second polarizer PL2 while maintaining the polarized state at the time of being made incident on the liquid crystal display panel LPN.

Consequently, when the liquid crystal display panel LPN of the first configuration example is observed from an oblique direction inclined by angle θ3 to the normal direction, the red transmitted light Z31 alone is visually recognized.

Recently, the pitches of the pixels (or the source lines) tend to be shortened while desired luminance (or transmissivity) is required to be maintained in each pixel, in accordance with requirement for downsizing and higher fineness of the panel. A measurement of increasing the width of the light-shielding layer BM is considered to suppress the color mixture, but the extension of the light-shielding layer BM causes degradation of the luminance or transmissivity of each pixel. In addition, a measurement of maintaining the distance between the adjacent pixel electrodes by reducing the number of strip electrodes of each pixel electrode is considered. However, in the display mode explained in the embodiments, since the transmissivity in the vicinity of the edge of the strip electrodes becomes a peak transmissivity, it is difficult to maintain the transmissivity per pixel by reducing the number of strip electrodes.

According to the embodiments, the color mixture can be suppressed by increasing the interval between the adjacent pixel electrodes, in the mode of color mixture (for example, mixture with the green color at the red color display) required to be most improved when the liquid crystal display panel is observed from the oblique direction. In particular, since the width of the light-shielding layer BM is not increased or the number of strip electrode is not reduced, degradation of the luminance or transmissivity can be suppressed. The display quality can be therefore enhanced.

In the embodiments, the interval between the adjacent pixel electrodes is increased by making the pixel electrode disposed at the red pixel remote from the pixel electrode at the green pixel, as the measurement of preventing the mixture of the transmitted light of the red pixel and the transmitted light of the green pixel, but the measurement is not limited to this example. The pixel electrodes having the interval set therebetween which should be increased, can be arbitrarily selected in accordance with the mode of color mixture required to be most improved.

For example, in the color mixture with the blue color at the red color display, the color mixture can be suppressed by adopting a layout of using the green pixel as the pixel PX1 shown in FIG. 2, using the red pixel as the pixel PX2 and using the blue pixel as the pixel PX3.

Similarly, in the color mixture with the red color at the green color display, the color mixture can be suppressed by adopting a layout of using the blue pixel as the pixel PX1 shown in FIG. 2, using the green pixel as the pixel PX2 and using the red pixel as the pixel PX3.

In addition, in the color mixture with the blue color at the green color display, the color mixture can be suppressed by adopting a layout of using the red pixel as the pixel PX1 shown in FIG. 2, using the green pixel as the pixel PX2 and using the blue pixel as the pixel PX3.

Similarly, in the color mixture with the red color at the blue color display, the color mixture can be suppressed by adopting a layout of using the green pixel as the pixel PX1 shown in FIG. 2, using the blue pixel as the pixel PX2 and using the red pixel as the pixel PX3.

In the color mixture with the green color at the blue color display, the color mixture can be suppressed by adopting a layout of using the red pixel as the pixel PX1 shown in FIG. 2, using the blue pixel as the pixel PX2 and using the green pixel as the pixel PX3.

Next, another configuration example will be explained.

Figure 6:
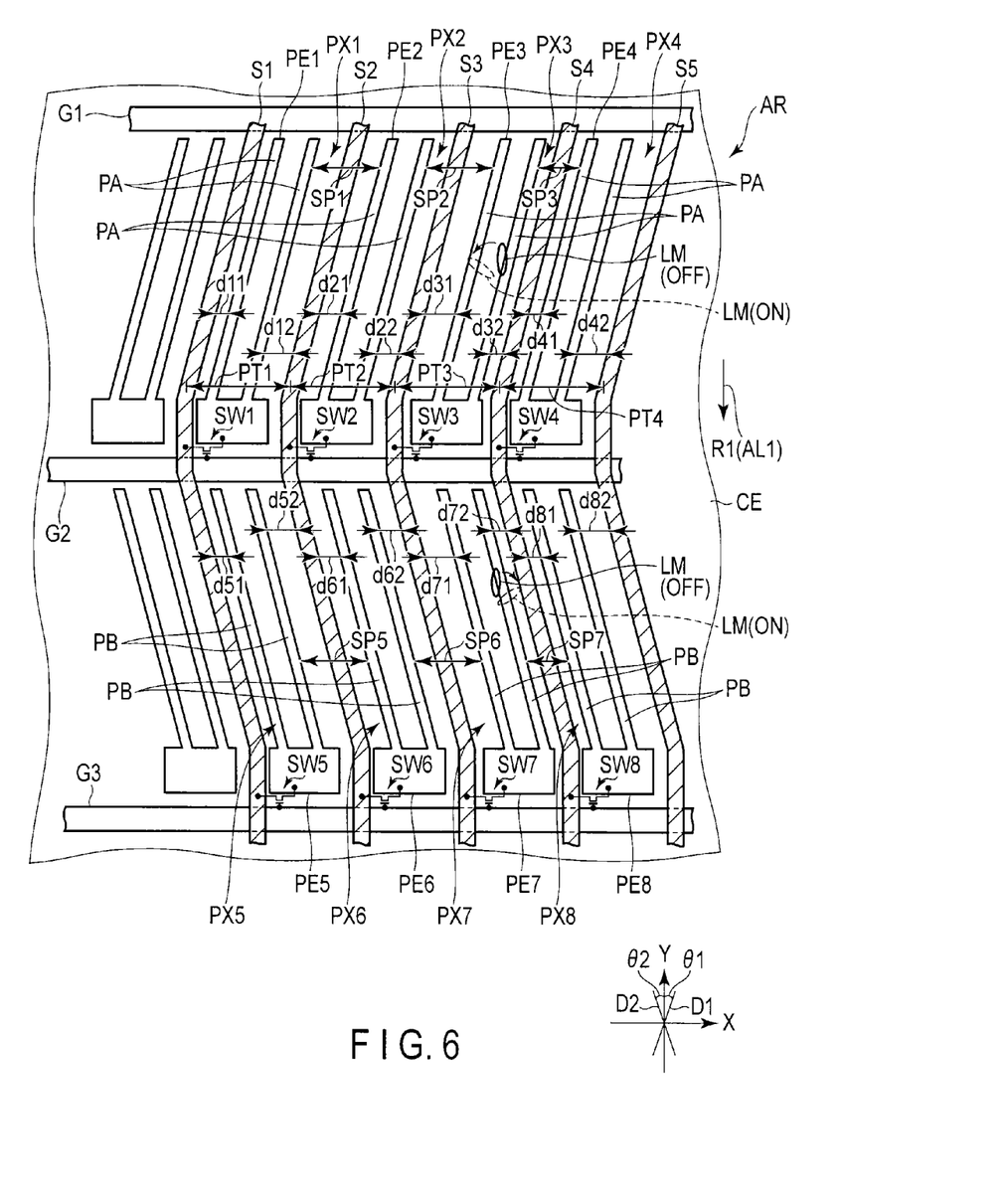
FIG. 6 is a schematic plan view showing a second configuration example of pixels in an array substrate AR shown in FIG. 1 as seen from a counter-substrate side.

FIG. 6 is a schematic plan view showing a second configuration example of the pixels in the array substrate AR shown in FIG. 1 as seen from the counter-substrate side.

The second configuration example is different from the first configuration example with respect to a feature that the pixel electrodes PE1 and PE3 are disposed to be remote from the pixel electrode PE2. The other constituent features and elements are the same as those in the first configuration example, and explanations are omitted. The definitions of each interval d and each interval SP are also the same as those of the first configuration example. However, the relationship in size among the interval d and the interval SP is different from the first configuration exampled as explained below.

More specifically, the pixel electrode PE2 is located at a middle position between the source line S2 and the source line S3. In other words, the interval d21 is substantially equal to the interval d22. The pixel electrode PE1 is closer to the source line S1 than to the source line S2. In other words, the interval d12 is greater than the interval d11. Furthermore, the interval d12 is greater than the intervals d21 and d22. In contrast, the interval d11 is smaller than the intervals d21 and d22. The pixel electrode PE3 is closer to the source line S4 than to the source line S3. In other words, the interval d31 is greater than the interval d32. Furthermore, the interval d31 is greater than the intervals d21 and d22. In contrast, the interval d32 is smaller than the intervals d21 and d22. In addition, the interval d12 is substantially equal to the interval d31, and the interval d11 is substantially equal to the interval d32. Explanation of the pixel PE4 is omitted since the pixel PE4 is disposed similarly to the pixel PE1.

The interval SP1 along the first direction X between the pixel electrode PE1 and the pixel electrode PE2 is equal to the interval SP2 along the first direction X between the pixel electrode PE2 and the pixel electrode PE3. Each of the interval SP1 and the interval SP2 is greater than the interval SP3 along the first direction X between the pixel electrode PE3 and the pixel electrode PE4.

Similarly, as for the pixel electrodes PE5 to PE7, too, the pixel electrode PE5 and the pixel electrode PE7 are disposed to be remote from the pixel electrode PE6. Explanation of the pixel PE8 is omitted since the pixel PE8 is disposed similarly to the pixel PE5.

The intervals d61 and d62 are substantially equal to each other. The interval d52 is greater than the interval d51. Furthermore, the interval d52 is greater than the intervals d61 and d62. In contrast, the interval d51 is smaller than the intervals d61 and d62. Furthermore, the interval d71 is greater than the interval d72. Moreover, the interval d71 is greater than the intervals d61 and d62. In contrast, the interval d72 is smaller than the intervals d61 and d62. In other words, the interval SP5 along the first direction X between the pixel electrode PE5 and the pixel electrode PE6 is equal to the interval SP6 along the first direction X between the pixel electrode PE6 and the pixel electrode PE7. Each of the interval SP5 and the interval SP6 is greater than the interval SP7 along the first direction X between the pixel electrode PE7 and the pixel electrode PE8.

Figure 7:
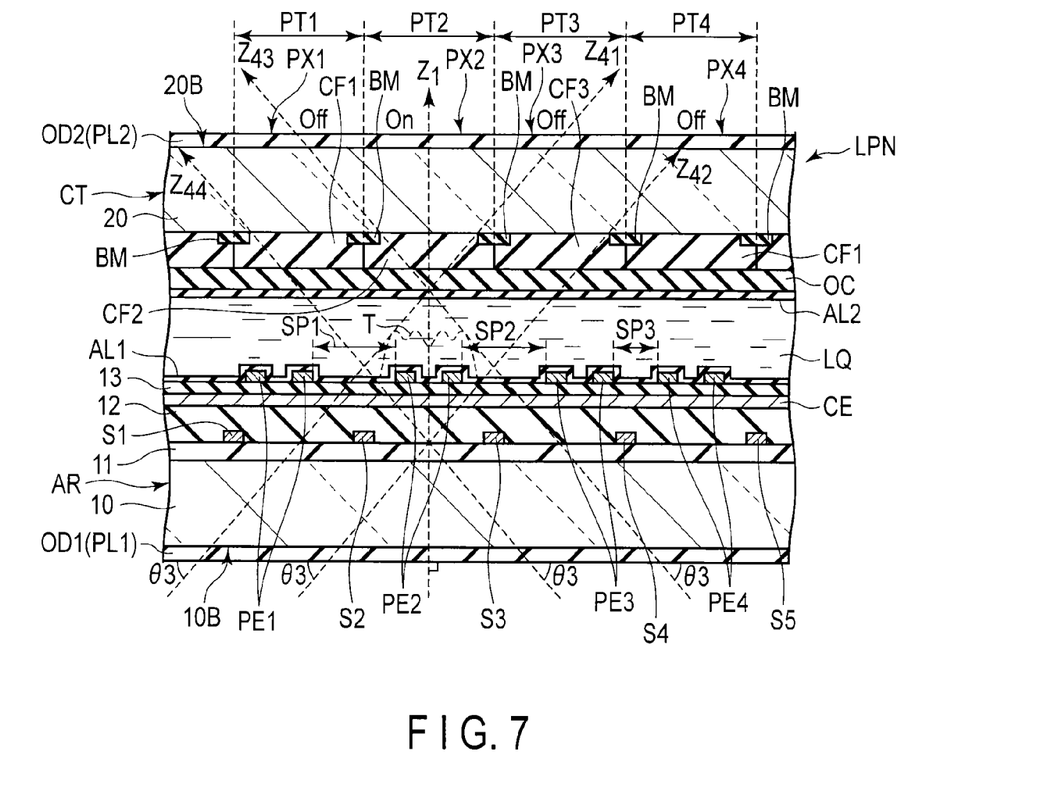
FIG. 7 is a cross-sectional view schematically showing a configuration of the liquid crystal display panel LPN comprising pixels PX1 to PX4 shown in FIG. 6.

FIG. 7 is a cross-sectional view schematically showing a configuration of the liquid crystal display panel LPN including the pixels PX1 to PX4 shown in FIG. 6. The basic configuration is the same as that of the first configuration example shown in FIG. 5(B), and duplicated explanations are omitted.

As shown in the figure, the interval SP1 between the pixel electrode PE1 and the pixel electrode PE2 is substantially equal to the interval SP2 between the pixel electrode PE2 and the pixel electrode PE3, in the liquid crystal display panel LPN of the second configuration example.

For example, a layout in which the interval SP1 is 13.7 µm, the interval SP2 is 13.7 µm, and the interval SP3 is 11.7 µm is applied. The pitches PT1 to PT4 are constant. For example, each of the pitches PT1 to PT4 is 19 µm.

The fringing field formed when the pixel PX2 is in the ON state is not close to any side of the pixels PX1 and PX3, but is formed at an approximately central position of the pixel PX2. For this reason, transmissivity distribution T in the pixel PX2 is high at an approximately central position of the pixel PX2 and is lowered in the vicinity of the boundaries between the pixel PX2 and the pixels PX1 and PX3.

In the second configuration example, since the pixel electrode PE1 and the pixel electrode PE3 are disposed to be remote from the pixel electrode PE2, extension of the fringing field to the vicinity of the pixel electrode PE1 and the pixel electrode PE3 can be suppressed. In other words, the alignment state of liquid crystal molecules can be maintained in the initial alignment state in the region from the vicinity of the boundary between the pixel PX2 and the pixel PX1 to the strip electrodes PA of the pixel electrode PE1, and the region from the vicinity of the boundary between the pixel PX2 and the pixel PX3 to the strip electrodes PA of the pixel electrode PE3.

In the liquid crystal display panel LPN of the second configuration example, the light Z1 which has passed through the liquid crystal layer LQ on the pixel electrode PE2, of the light made incident perpendicularly on the first polarizer PL1, passes through the color filter CF2 and is visually recognized as the red transmitted light. In addition, each of the light Z41 and the light Z43 which transmit the color filter CF2 after passing through the liquid crystal layer LQ on the pixel electrode PE2, of the light made incident on the first polarizer PL1 at an angle of incidence θ3, passes through the second polarizer PL2 and becomes red transmitted light. In contrast, the light Z42 which passes through the liquid crystal layer LQ in the vicinity of the boundary between the pixel PX2 and the pixel PX3, of the light made incident at the same angle of incidence θ3, is hardly modulated by the liquid crystal layer LQ, but transmits the color filter CF3 on the pixel electrode PE3 and is absorbed by the second polarizer PL2. Similarly, the light Z44 which passes through the liquid crystal layer LQ in the vicinity of the boundary between the pixel PX2 and the pixel PX1, of the light made incident at the same angle of incidence θ3, is hardly modulated by the liquid crystal layer LQ, but transmits the color filter CF1 on the pixel electrode PE1 and is absorbed by the second polarizer PL2. In other words, each of the incident light Z42 and the incident light Z44 does not contribute to display.

Consequently, when the liquid crystal display panel LPN of the second configuration example is observed from an oblique direction inclined by angle θ3 to the normal direction, each of the red transmitted light Z41 and the red transmitted light Z43 alone is visually recognized. In other words, color mixture of the green color and the blue color at the red color display can be suppressed.

Thus, in the second configuration example, too, the same advantage as that in the first configuration example can be obtained. Furthermore, in the second configuration example, the color mixture can be suppressed without deterioration of the luminance or transmissivity, by increasing the interval between the adjacent pixel electrodes, in each mode of mixture of two colors (for example, mixture of the green color and the blue color at the red color display) at the time of observing the liquid crystal display panel from the oblique direction. Display quality can be therefore further enhanced.

In the second configuration example, the interval between the adjacent pixel electrodes is increased by making the strip electrodes of the pixel electrode disposed at the green pixel and the strip electrodes of the pixel electrode disposed at the blue pixel remote from the pixel electrode at the red pixel, as the measurement of preventing the color mixture of the transmitted light of the red pixel and the transmitted light of the green and blue pixels, but the measurement is not limited to this example.

In the color mixture of the red color and the blue color at the green color display, for example, the color mixture can be suppressed by adopting a layout of using the red pixel or the blue pixel as the pixel PX1 shown in FIG. 2, using the green pixel as the pixel PX2, and using the color pixel different from the pixel PX1 and the pixel PX2 as the pixel PX3.

Similarly, in the color mixture of the red color and the green color at the blue color display, the color mixture can be suppressed by adopting a layout of using the red pixel or the green pixel as the pixel PX1 shown in FIG. 2, using the blue pixel as the pixel PX2, and using the color pixel different from the pixel PX1 and the pixel PX2 as the pixel PX3.

As described above, the embodiments can provide the liquid crystal display device capable of suppressing the deterioration in display quality.

In the embodiments, each of the pixel electrodes PE1 to PE8 comprises the strip electrodes, but each of the pixel electrodes PE1 to PE8 may be formed in a flat plate shape and each of the pixel electrodes PE1 to PE8 may comprise a slit extending along the first extending direction D1 or the second extending direction D2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
   a first substrate including a plurality of source lines arranged at regular intervals along a first direction, a plurality of gate lines arranged at regular intervals along a second direction crossing the first direction, and a plurality of pixels enclosed with the source lines and the gate lines;
   a second substrate; and
   a liquid crystal layer including liquid crystal molecules, an orientation of which is changed by an electric field, and held between the first substrate and the second substrate, wherein
   the plurality of pixels include a first pixel, a second pixel, and a third pixel,
   each of the first to third pixels includes a connecting portion arranged parallel to the gate lines, a plurality of strip electrodes extending from the connecting portion in the second direction, and a common electrode as a planar electrode opposed to the connecting portion and the plurality of strip electrodes,
   the electric field is formed between the common electrode and the plurality of strip electrodes,
   adjacent connecting portions are provided at regular intervals,
   a first interval between a strip electrode of the first pixel and a strip electrode of the second pixel that is adjacent to the first pixel in the first direction is different than a second interval between the strip electrode of the first pixel and a strip electrode of the third pixel that is adjacent to the first pixel in a third direction that is opposite to the first direction,
   the electric field formed by the first pixel changes the orientation of the liquid crystal molecules at a boundary between the first pixel and the second pixel, and does not change the orientation of the liquid crystal molecules at a boundary between the first pixel and the third pixel,
   the plurality of strip electrodes extend parallel to each other, and an interval between each corresponding outermost strip electrode of the plurality of strip electrodes and each source line adjacent to the each corresponding outermost strip electrode varies from pixel to pixel.

2. The liquid crystal display device of claim 1, wherein widths of respective pixels along the first direction are equal to each other.

3. The liquid crystal display device of claim 1, wherein a portion in which each strip electrode and each connecting portion are connected to each other varies from pixel to pixel.

4. The liquid crystal display device of claim 1, wherein the strip electrodes extend parallel to each other.

5. The liquid crystal display device of claim 1, wherein the second substrate includes a plurality of color filters corresponding to a plurality of colors.

6. A liquid crystal display device comprising:
   a first substrate including first to fourth source lines arranged at regular intervals along a first direction, a first pixel including a first pixel electrode located between the first source line and the second source line, a second pixel including a second pixel electrode located between the second source line and the third source line, a third pixel including a third pixel electrode located between the third source line and the fourth source line, and a common electrode as a planar electrode opposed to the first pixel electrode, the second pixel electrode and the third pixel electrode;

a second substrate; and a liquid crystal layer held between the first substrate and the second substrate, wherein the first pixel electrode includes a first connecting portion, a first strip electrode provided in proximity to the first source line and extending from the first connecting portion parallel to the first source line, and a second strip electrode provided in proximity to the second source line and extending from the first connecting portion parallel to the second source line, the second pixel electrode includes a second connecting portion, a third strip electrode provided in proximity to the second source line and extending from the second connecting portion parallel to the second source line, and a fourth strip electrode provided in proximity to the third source line and extending from the second connecting portion parallel to the third source line, the third pixel electrode includes a third connecting portion, a fifth strip electrode provided in proximity to the third source line and extending from the third connecting portion parallel to the third source line, and a sixth strip electrode provided in proximity to the fourth source line and extending from the third connecting portion parallel to the fourth source line, an interval between the second strip electrode and the third strip electrode is different than an interval between the fourth strip electrode and the fifth strip electrode, an orientation of the liquid crystal layer is changed by an electric field that is formed between each of the first to third pixel electrodes and the common electrode, the electric field formed by the second pixel electrode and the common electrode changes the orientation of the liquid crystal layer at a boundary between the first pixel and the second pixel, and does not change the orientation of the liquid crystal layer at a boundary between the second pixel and the third pixel; and wherein an interval between each corresponding outermost strip electrode of each of the first to third pixel electrodes and each source line adjacent to the each corresponding outermost strip electrode varies from pixel to pixel.

7. The liquid crystal display device of claim 6, wherein an interval between the second source line and the third strip electrode and an interval between the third source line and the fourth strip electrode are different from each other.

* * * * *